United States Patent [19]
Menigat et al.

[11] 3,921,543
[45] Nov. 25, 1975

[54] METHOD OF INCINERATING SALT-CONTAINING LIQUID SLUDGE

[75] Inventors: Richard Menigat, Dietzenbach; Wolfgang Fennemann, Karben, both of Germany

[73] Assignee: Metallgesellschaft Aktiengesellschaft, Frankfurt am Main, Germany

[22] Filed: July 15, 1974

[21] Appl. No.: 488,795

[30] Foreign Application Priority Data
July 28, 1973 Germany............................ 2338432

[52] U.S. Cl................... 110/7 B; 110/8 F; 110/28 J
[51] Int. Cl.² ............................................ F23G 7/00
[58] Field of Search............ 122/4 D; 110/7 R, 8 R, 110/8 F, 28 J, 7 B, 7 S

[56] References Cited
UNITED STATES PATENTS

| | | | |
|---|---|---|---|
| 3,583,339 | 6/1971 | Kube | 110/7 |
| 3,736,886 | 6/1973 | Menigat | 110/8 |
| 3,805,714 | 4/1974 | Sharpe | 110/7 |
| 3,822,653 | 7/1974 | Ghelfi | 110/7 |

*Primary Examiner*—Kenneth W. Sprague
*Attorney, Agent, or Firm*—Karl F. Ross; Herbert Dubno

[57] ABSTRACT

A liquid sludge containing salts such as NaCl is injected into a fluidized-bed incinerator containing a bed of corundum or iron oxide which is fluidized by an oxygen-containing gas at a superficial velocity of at least 3 meters/second. The bed is therefore kept in constant rapid agitation heated to a temperature sufficient to vaporize the salts. The thus vaporized salts are thereafter scrubbed out of the exhaust gases of the incinerator with a water spray.

6 Claims, 1 Drawing Figure

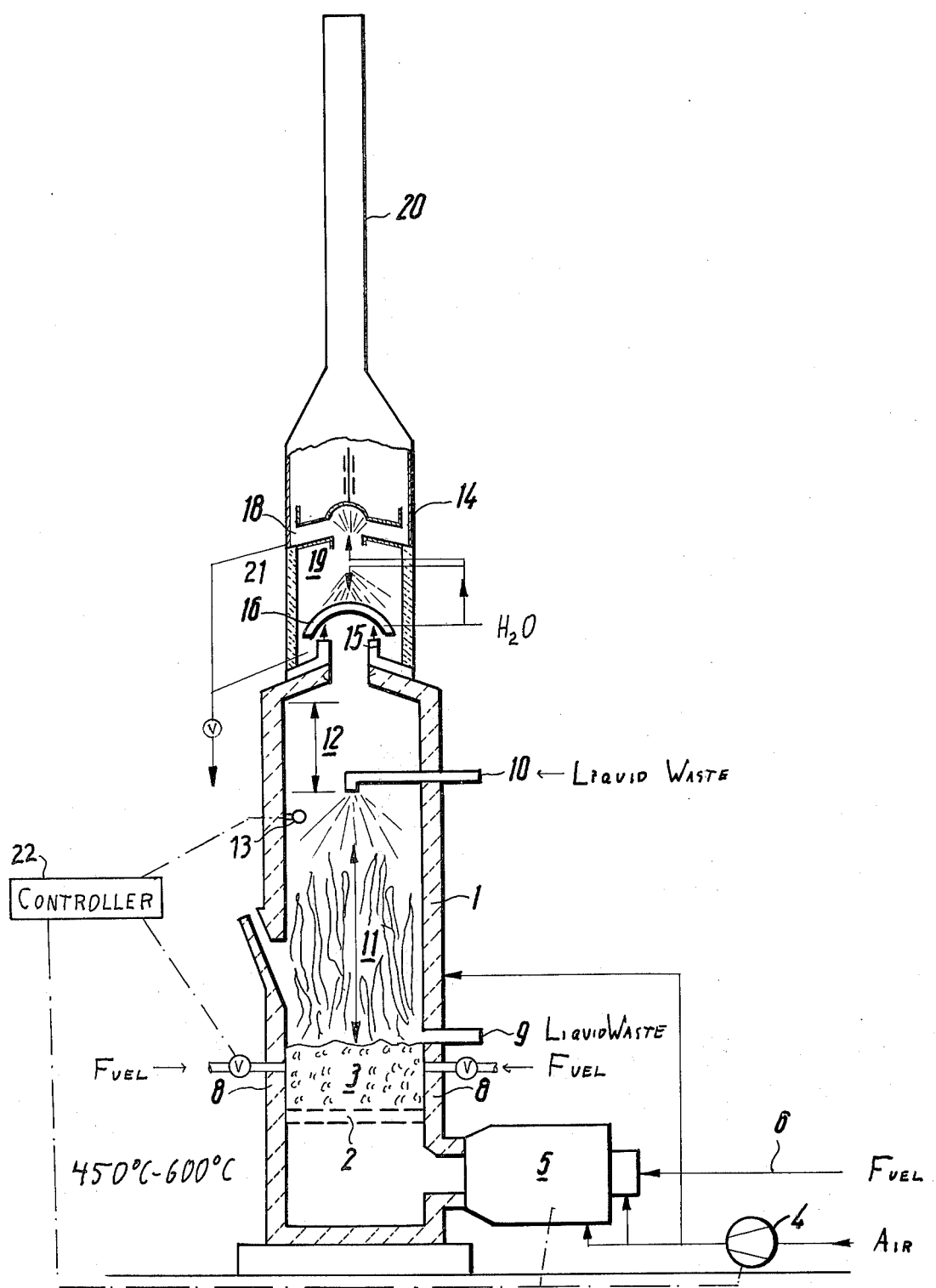

3,921,543

METHOD OF INCINERATING SALT-CONTAINING LIQUID SLUDGE

FIELD OF THE INVENTION

The present invention relates to a method of and apparatus for incinerating a liquid. More particularly this invention concerns a method of operating a fluidized-bed incinerator for the combustion of sludge.

BACKGROUND OF THE INVENTION

The treatment of residential or industrial sewage creates clarifier sludges which must be used for a useful purpose or discarded. The utilization of clarifier sludge by composting and, particularly, processes of incinerating clarifier sludge have become increasingly significant. The water-containing waste is usually dewatered in filters or centrifuges or on drying beds and the dewatered waste is charged into a furnace and is incinerated therein.

Multiple-hearth furnaces have been used initially for such incineration but have a number of disadvantages. The waste proceeding through the predrying hearths often has an excessively high moisture content as it enters the combustion zone so that incineration is impeded, or the sludge fed to the furnace is too dry so that the quantity of heat produced by the incineration is lost before it can be used and the high temperatures result in damage to the flue or chimney.

These disadvantages can be avoided if the waste is dewatered in centrifuges and the material discharged from the centrifuges is fed to a multiple hearth furnace by a belt conveyor, a pan feeder, a metering screw conveyor, or the like. On the other hand, such a system involves difficulties in operation because waste may form deposits or stick to the conveyor or swell so that the operation is unhygienic and creates offensive smells. Difficulties are again encountered in the control of the multiple hearth furnace.

Instead of multiple hearth furnaces, fluidized-bed furnaces have also been used to incinerate water-containing waste, which may be liquid or pasty, such as oil sludges, waste oils, oil emulsions, paint residues, or clarifier sludges from refineries, petrochemical, chemical and residential sewage plants. Favorable combustion conditions are provided in some systems by a special supply and distribution of the air and by the feeding of clarifier sludge through a vertical injector tube which projects downwardly into the combustion chamber of the fluidized-bed furnace. It is also known to incinerate the sludge together with combustible trash.

Other proposals are concerned with the utilization of the heat content of the exhaust gases from the fluidized-bed furnace. The sludge is thermally conditioned in a steam-producing intermediate stage or the heat content of the hot exhaust gases is directly used to pre-dry the sludge.

In a particularly advantageous system, the waste is dried and comminuted at the same time and the comminuted dry waste is fed to and distributed over the grate area of the fluidized-bed furnace and incinerated therein. The waste may also be dried and comminuted in a multiple hearth furnace which is heated with the exhaust gases from the fluidized-bed furnace.

Another proposal considerably increases the output of fluidized-bed furnaces in that one partial stream of the waste is fed into or closely above the fluidized bed and a second partial stream is fed from above into the secondary combustion zone which lies on the expanded fluidized bed but is sufficiently spaced from the exhaust gas outlet at the furnace top that an afterburning of volatile constituents is ensured.

More recently, increasing quantities of water-containing wastes which cannot be incinerated by conventional processes in the fluidized bed owing to the use of lake and sea water are being produced by refineries and petrochemical operations, particularly in coastal locations. After a relatively short time of operation, the fluidized bed becomes a solid fused mass owing to a continuous enrichment with salt so that perfect combustion is no longer possible and the combustion eventually ceases entirely.

OBJECTS OF THE INVENTION

It is therefore an object of the present invention to provide an improved method of incinerating a liquid.

More particularly an object of this invention is the provision of an improved system for incinerating sludge containing a high proportion of simple salts such as sodium chloride.

SUMMARY OF THE INVENTION

In the process of burning water-containing wastes, particularly clarifier sludges which have a high common salt content, in a fluidized-bed furnace operated with an oxygen-containing gas phase, this object is achieved according to the invention in that the turbulencing ulencing gas has a mean velocity of parallel flow of at least 3 meters/second at the surface of the fluidized bed and the waste is incinerated in a bed of inert solids with the bed heated to a temperature above the melting point of said salts and the superficial velocity and/or the bed temperature being adjusted to ensure that the predominant part of said salt is discharged with the exhaust gases.

In this connection the mean velocity of parallel flow of the fluidizing gas is the mean velocity of parallel flow in the empty fluidized-bed furnace without its solids bed. This is also referred to as the superficial velocity (see *Perry's Chemical Engineers Handbook*, McGraw-Hill; 1963). The turbulencing gas is the gas which is produced by the incineration of the waste with the addition of fuel and oxygen containing fluidizing gas.

The materials fed to form the bed consist of materials which either do not react or else form compounds with the fed waste, with components thereof or with the combustion products which have melting and sintering points above the operating temperatures of the fluidized-bed furnace.

Particularly suitable bed materials according to this invention are iron oxide granules having an average particle diameter of 0.2 mm to 4 mm and a bulk density above 2.5 kilograms per liter, or corundum having about the same particle size. These oxides are generally used only when a new plant is put into operation because during the incineration of sludge the inorganic substances fed in with the sludge are transformed into particularly oxidic compounds or mixed oxides of iron, calcium, and manganese and these compounds constitute a so-called chemical bed material which may be used alone or in a mixture with the starting material.

Such a bed material has excellent properties and because it is produced as a byproduct in many industrial plants it is also eminently suitable as a starting material for new plants or for a new operation cycle.

In the process according to the invention, the mean velocity of parallel flow of the turbulencing or fluidizing gas and the temperature of the fluidized bed should be selected in dependence on the resulting common salt vapor pressure. Thus common salt is made to be discharged with the exhaust gases approximately at the rate at which it enters the fluidized-bed furnace with the water-containing waste. The operating conditions can be determined most simply by observing the fluidized bed through a sight glass. If there is an agglomeration of bed material in certain parts of the bed surface, the speed of the turbulencing gas and/or the bed temperature is to be increased.

According to another method, satisfactory operation can be determined by an analysis of the bed material if a chemical bed material is used. Any increase of the common salt content will then suggest that the feed rate of the fluidizing gas and/or the bed temperature are too low.

A third method of determination is recommended if, according to the invention, the exhaust gases are scrubbed to remove common salt therefrom. The salt content of the spent scrubbing water and the common salt content of the sludge are analytically determined and compared.

To prevent an undesired enriching of salts as a result of inevitable small fluctuations of the flow rate of the turbulencing gas and of the temperature of the fluidized bed, the temperature of the fluidized bed is suitably adjusted to be about 30° C – 50° C above the desired value which has been determined.

The temperatures of the fluidizing bed, according to the present invention, are in the range of 900° C – 1100° C. In case of high common salt contents it may be desirable to increase the mean velocity of parallel flow of the turbulencing gas to values above 4 meters/second.

The waste is fed into the fluidized-bed furnace by known methods, e.g., directly into or closely above the fluidized bed or at a first point directly into or closely above the fluidized bed and at a second point in the freeboard above the fluidized bed.

DESCRIPTION OF THE DRAWING

The above and other objects, features, and advantages will become more readily apparent from the following, reference being made to the drawing whose sole FIGURE is a diagrammatic representation of an incinerator according to this invention.

SPECIFIC DESCRIPTION

The fluidized-bed furnace comprises a lined furnace shaft 1 having a fluidizing grate 2 supporting a fluidized bed 3 of fluidized inert solids. A fluidizing air blower 4 compresses the required fluidizing and combustion air, and forces it through the fluidizing grate to maintain the bed in a fluidized state. In the combustion chamber 5, the fluidizing air is heated to a temperature of 450° C – 600° C by a combustion of gas or oil supplied through conduit 6. When the fluidized bed has reached a temperature between 450° C and 600° C, the supply of fuel through lances 8 is adjusted by a controller 22 in dependence on the temperature in the top part of the furnace so that an operating temperature of preferably 900° C – 1100° C is maintained.

In this process the liquid waste is fed in at two points. The primary feed stream is discharged by the feeder 9 into the fluidized bed or closely above the fluidized bed and the secondary feed stream is discharged from conduit 10 opening over the secondary combustion zone 11. The quantitative combustion of the evaporated hydrocarbons and volatile constituents from the secondary feed stream of waste at 10 is accomplished in the afterburning zone 12. A temperature sensor 13 connected to controller 22 is used to maintain the exhaust gas temperature at the desired value. The hot exhaust gases emerge through a transfer duct 15 and are fed to a scrubber 14, e.g., a radial flow scrubber, which is mounted directly on top of the furnace.

In the scrubber, the exhaust gas is treated in two stages such that the salts contained in the gas are removed therefrom and the gas is cooled simultaneously. A shield 16 and the scrubbing zone 18 of the scrubber are designed to ensure a satisfactory draining of spent scrubbing water and to serve as an explosion door. The cooling zone 19 of the scrubber 14 has an acid- and heat-resisting lining 21. In dependence on the pressure difference, the annular gap in the scrubbing zone 18 of the scrubber 14 is adjusted so that a uniform scrubbing effect will be ensured even in the case of a varying incineration rate and a varying rate of exhaust gas production. The purified exhaust gases leave the plant through an exhaust gas chimney 20 directly mounted on the plant and are discharged into the atmosphere.

The controller 22 is also connected to a salinity detector 23 in drain lines 24 and to burner 5 and blower 4 to increase the temperature in the freeboard spaces 11 and 12 and/or the velocity of the turbulencing gas.

The incinerator consisted of a fluidized-bed furnace of the kind shown. The furnace had a cylindrical furnace portion which was 0.5 meter in diameter, corresponding to a grate area of 0.2 square meters. The furnace was initially provided with 273 kilograms of electrocorundum having a particle size of 0.5 mm–2 mm (50% 0.5–1 millimeter, 50% 1–2 millimeters) and a bulk density of 1.88 kilograms/liter. The volume of the fluidized bed was 145 liters.

Propane was used as a fuel for initial heating of the fluidized-bed furnace and its continued heating during operation. The temperature of the fluidized bed was adjusted to 950°C±20°C. The mean velocity of parallel flow of the turbulencing gas amounted to 4.25 meters/second.

A salt-containing refinery sludge which had the following main components was incinerated:

| Mineral constituents after heating to 1000°C. | about 5 grams per liter |
|---|---|
| Hydrocarbons | about 40 grams per liter |
| NaCl (mp. 804°C, b.p. 1490°C) | 15.0 grams per liter |
| $MgSO_4$ (decomposes 1124°C) | 0.92 gram per liter |
| $MgCl_2$ (m.p. 708°C, b.p. 1412°C) | 2.3 grams per liter |
| $CaSO_4$ | 0.7 gram per liter |
| $K_2SO_4$ | 0.48 gram per liter |

About two-thirds of the sludge were fed through a lance directly into the fluidized bed from a point spaced 60 centimeters above the grate and about one-third was fed through another lance at a point spaced 3.2 meters over the grate. The feed rate was about 136.5 liter/hours corresponding to 783 liter/hour/square meter. 1.3 cubic meter/hour were used to scrub the hot exhaust gases.

During the operation of the fluidized-bed furnace, the weight of the fluidized bed as well as its bulk density increased. The bulk density had increased from 1.88 kilogram/liter to 2.2–2.3 kilogram/liter after about 90 hours of operation and remained constant during operation for about 340 additional hours. Bed material was withdrawn from time to time so that the quantity of the fluidized bed remained substantially constant during operation.

A total of 58.7 cubic meters of sludge had been incinerated after a total operating time of 430 hours. The sludge introduced 294 kilograms mineral constituents and 1245 kilograms of water-soluble salts. A disturbance of the operation of the fluidized bed by agglomeration or sticking-together of individual particles of the fluidized bed was not observed.

The bed material consisting initially of 273 kilograms of corundum had increased to a total of 443 kilograms, which meant a production of 170 kilograms of chemical bed material. The $Al_2O_3$ content of the bed material had decreased from an initial value of virtually 100% to 47.1%. The $Al_2O_3$ content is lower than can be explained by the increase in bed-material weight because there is a loss due to the gas-entraining of fine-grained corundum at the beginning of the process.

We claim:

1. A method of operating a fluidized bed incinerator for burning wastes containing sodium chloride and water, said method comprising the steps of:
    a. fluidizing a particulate bed of an inert material in the wastes with an oxygen-containing gas creating a turbulencing gas with a superficial velocity equal to at least 3 meters/second;
    b. heating said bed in said incinerator to a temperature above the melting point of said sodium chloride to form an exhaust gas containing a predominant part of said sodium chloride entrained within the exhaust gas;
    c. scrubbing the exhaust gas to remove the sodium chloride contained therein;
    d. discharging the now sodium chloride-free exhaust gas from the incinerator; and
    e. accumulating the remaining sodium chloride in particulate form to then become part of the fluidized bed itself for subsequent waste incineration.

2. The method defined in claim 1 wherein said bed comprises iron-oxide granules having a particle diameter between 0.2 mm and 4.0 mm and a bulk density above 2.5 kilogram/liter.

3. The method defined in claim 1 wherein said bed comprises corundum.

4. The method defined in claim 1 wherein said bed is heated by burning combustible fuel at said incinerator.

5. The method defined in claim 1 wherein said bed is heated to a temperature at least 30°C above the advised value.

6. The method defined in claim 1 wherein said mean velocity of the turbulencing gas is equal to at least 4 meters/second.

* * * * *